United States Patent [19]

Cornell, III

[11] 4,355,629
[45] Oct. 26, 1982

[54] SUPERIOR PERFORMANCE PASSIVE SOLAR WATER HEATER

[76] Inventor: S. Douglas Cornell, III, 911 S. Marvin Ave., Tucson, Ariz. 85710

[21] Appl. No.: 209,756

[22] Filed: Nov. 24, 1980

[51] Int. Cl.³ .............................................. F24J 3/02
[52] U.S. Cl. .................................. 126/437; 126/438; 126/450; 126/451
[58] Field of Search ............... 126/438, 450, 437, 400, 126/430, 436, 432, 441, 446, 451; 165/134, 135

[56] References Cited

U.S. PATENT DOCUMENTS

| | | | |
|---|---|---|---|
| 735,321 | 8/1903 | Walker | 126/438 |
| 820,127 | 5/1906 | Pope | 126/438 |
| 4,011,855 | 3/1977 | Eshelman | 126/438 |
| 4,083,357 | 4/1978 | Fischer | 126/451 |
| 4,091,796 | 5/1978 | Bieringer et al. | 126/438 |
| 4,231,204 | 11/1980 | Krueger et al. | 126/450 |
| 4,271,824 | 6/1981 | Decker | 126/450 |

Primary Examiner—Daniel J. O'Connor
Attorney, Agent, or Firm—Gregory J. Nelson

[57] ABSTRACT

A superior performance passive solar water heater of the type combining heat absorber and storage in a tank adapted to minimize heat loss due to night time re-radiation, wind, and other methods by which a solar heater loses heat due to radiation, conduction, and convection of the heat from the water heater. More specifically, improvements are made to substantially reduce the water storage tank heat radiation, to maintain the tank a substantially air-tight environment, to interrupt in the heat conduction path from the tank environment, to remove the hottest water first from the heated tank, and to introduce cold water into the tank in such a manner as to miniminally disrupt the heated water in the tank.

3 Claims, 8 Drawing Figures

& # 35;  SUPERIOR PERFORMANCE PASSIVE SOLAR WATER HEATER

BACKGROUND OF THE INVENTION

Solar water heaters have been known for a substantial period of time and a great deal has been written about heating water or other fluid by the sun, including a number of patents which have been issued.

For example, Walker in U.S. Pat. No. 705,167 discloses a tank type solar water heater where, in addition to sun heating, the water is heated prior to its entry into the tank by passage through the firebox of a stove.

Additional patents which show solar water heaters of other types are typified by U.S. Pat. No. 3,853,114 to Gaydos, Jr., wherein a solar heater comprising a helix of tubing is contained within a transparent box, the box being contained within a second transparent box, the inner box then being filled around the tubing with a mixture of magnetite, perlite and lamp black. Water is then circulated through the tubing.

As it can be seen from these and numerous other patents, solar water heaters are available in many and varied configurations.

However, for a solar water heater of the type combining heat absorber and storage in a tank to be economically competitive, it is necessary that the inherent shortcomings of such solar water heaters be overcome. The advantages of such solar water heaters are clear so long as the sun is shining upon the heater and heating the water, and providing not too much water is being drawn at any one time, or in the alternative, the solar water heater has had an opportunity to heat and store water prior to being withdrawn. In such cases, the solar water heater stands as a substantial challenge to use of electricity, natural gas, coal, or oil means to heat water for residential and light commercial uses.

However, some of the disadvantages of such solar water heaters are that the solar water heater tends to lose substantial amounts of heat at times when the sun is not shining, for example, night time, or when a chilling wind blows around the solar water heater structure and robs the heated water reservoir of its heat. A heated body in a less hot atmosphere is subject to heat loss due to radiation (long-wave heat radiation) as well as the heat being removed by being conducted away through heat conductive materials, such as metal, and by convection, such as air currents passing by the heated surface and carrying the heat off with the air.

It is common for solar water heaters which store the hot water on top of a house roof, that the water temperature during the daytime may well range as high as or higher than 180° F., but due to heat loss, drop to 80° F., or lower at night time. Thus, in the morning before the sun has had an opportunity to add substantially any heat to the water stored on the roof, the water user finds the heated water inadequate. If the water is not drawn on too heavily, and especially so in the winter time, the water heater will function later on in the morning and during the afternoon, again losing heat rapidly to the environment as night falls.

It is to the heat loss from such solar water heaters and improvements to prevent same that the Applicant's invention is directed.

SUMMARY OF THE INVENTION

Applicant's invention is directed to improvements in solar water heaters of the type combining heat absorber and storage in a tank whereby the loss of heat to the environment for such times as night time is minimized, usually in the order of not more than 15° to 25° F. Applicant achieves minimal heat loss in his invention by the novel means and methods he employs in construction of the solar water heater. Applicant firstly utilizes a water tank which is covered on its sides and ends by a selective surface having the properties of absorbing substantially all of the solar radiation incident thereon, and which also has the property of minimal re-radiation. In addition, Applicant deposits his water tank in a rectangular type box, all surfaces of which except one are insulated, and one surface of which is a window that admits solar radiation, which window consists of multiple glazings for increased retention of heat. Each inner glazing is mounted at its edges to the inner surface of said insulation, so that heat that would otherwise conduct from said edges to the exterior of the water heater is interrupted. All other inside surfaces of said box are lined with reflective foil, the reflective foil collecting the sun's rays and re-directing the rays to the tank's outer surface. In order to minimize conduction of heat along the reflective foil from the inner-most chamber, wherein the tank is located, past the inner-most glazing to the next chamber, between the inner-most glazing and the next glazing, and in turn past that next glazing to the next chamber, and so forth, Applicant interrupts the conduction of heat passed by means of scribing notches through the reflective foil surface and into the insulative backing to which the foil surface is adhered. One such notch runs close to and parallel with the edge of each inner glazing and follows around the entire perimeter of each inner glazing. In addition, Applicant covers this line of interruption of the foil reflective surface with his means of glazing, utilizing either an additional piece of insulation or a non-heat conductive sealant, the sealant installed between the foil reflective surface and the turned up edge of the glazing. In addition, the sealant provides that the air immediately surrounding the heated water holding tank is in a sealed configuration so as to lessen heat loss by convection.

In addition, Applicant, in constructing the container which holds the water tank, again removes the reflective foil surface from all points of the insulated board to which it is attached which could conduct heat outside the container. In addition, Applicant additionally coats his support means holding the tank into place with said selective surface to receive additional heat and minimize re-radiation of heat, and then insulates the the tank supporting means to minimize heat conduction to the outer portion of the solar water heater.

It is the object of the subject invention to provide a passive solar water heater of the type combining heat absorber and storage in a tank which minimizes heat losses at all times, and especially during times when the solar water heater is not actively receiving solar heat.

DETAILED DESCRIPTION OF THE PREFERRED EMBODIMENT

Figure 1:
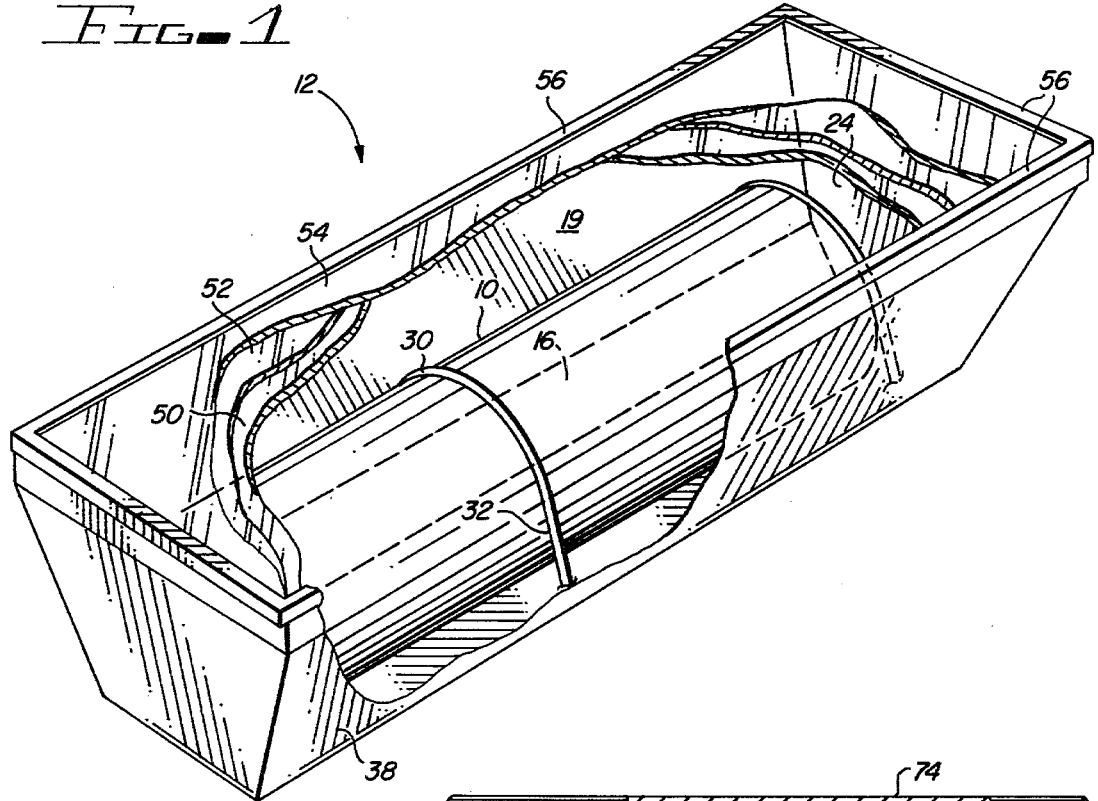
FIG. 1 is a perspective view of the subject invention.

Referring now to FIG. 1, a perspective view of the subject invention is shown. Proceeding interiorly to the outside, shown in water tank 10, normally a modified water heater tank, situated centrally to the rectangular shaped and heavily insulated box 12. Box 12 comprises a coffin shaped contained having a plurality of angled sides and two angled ends. All sides shown in FIG. 1, which comprise the insulated and reflective surfaces later described, are situated interiorly to an outer shell, preferably fiberglass, holding the sides and ends in fixed configuration. From the view shown in FIG. 1, the shell is not visible. Proceeding outwardly from water tank 10, on either side of the elongated tank are the plurality of surrounding sides, beginning with the bottom most portion, bottom insulation board 14, of which only a thin strip is shown on either side of the water tank. Connecting then on each side of bottom insulation board 14 are first angled insulation board sides 16 and 18 which, in turn are connected to top angled insulation board sides 20 and 22. Attaching at each end then are the end insulation boards 24 and 26, each of which makes contact with the end portions of the bottom insulation board 14, the first angled insulation board sides 16 and 18, and the top insulation board sides 20 and 22. As indicated earlier, even ends 24 and 26 are angled in relationship to the bottom 14.

Attached to the inside surface of all the insulation boards utilized in the invention, namely boards 14 through 26 respectively, is a sunlight reflecting foil. The insulation boards, and thus the reflective foil, are angled such that substantially all the sunlight entering the window into the water heater and not impinging directly onto the tank is reflected onto it when the sun's rays are at right angles to the window or within 23.5 degrees of arc from right angles to the window. Thus if the water heater is positioned with the window facing the position of the noon sun on the spring and fall equinoxes, substantially all the sunlight entering through the window will be received by the tank at noon at anytime during the year as the sun swings through a 23.5 degree arc from equinoz to solstice and back. Then, water tank 10 is coated with a selective coating 11 which has properties of absorbing a substantially large portion of the sun's short-wave radiation, but inhibits the long-wave re-radiation which would be emitted by the heated water tank 10. An example of the type of selective surface 11 utilized in the invention is the plated coating generically known as black chrome, or the black or other color paints which are commonly available, all surfaces characterized by high absorptance and low emissivity. The invention, of course, is not restricted to the application of the particular selective surface above described, but it is realized that there are many types of surfaces which may be placed upon the tank and which are available to the public, including specially prepared paints.

Not shown in FIG. 1 for purposes of clarity are the top mounted glazings which are placed within the cavity formed by the sides shown in FIG. 1 and which tend to inhibit loss of tank heat due to wind, air convection, conduction and long-wave re-radiation at all times.

Figure 2:
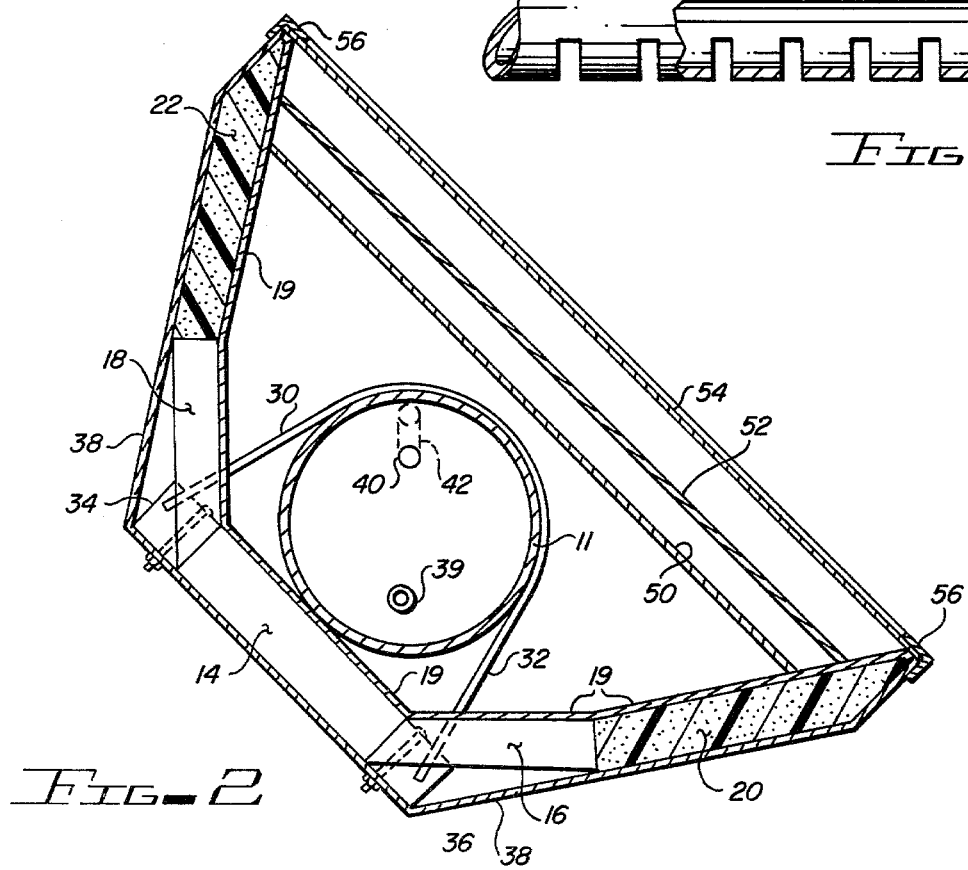
FIG. 2 is an end view of the subject improved solar water heater.

Referring now to FIG. 2, an end view of the inventive improved solar water heater is detailed in cross-section. Here the end insulation board 26 has been removed for best viewing. Proceeding again interiorly and moving outward, end view of tank 10 is shown, tank 10 being supported upon bottom piece 14 by means of four metal supports, two of which are shown and variously numbered 30 and 32. These supports are welded to the end of the tank 10 and extend down to holding blocks 34 and 36 which are embedded in bottom 14 and then attached to the outside frame 38.

Additionally shown upon the end of tank 10 is the fitting 40 which, when connected with piping (not shown) allows withdrawal of heated water from tank 10. Shown in dotted form is piping 42 interiorly to the tank which rises in the upper portion inside the tank in order that the hottest water be drawn off. Water inlet coupling 39 is shown towards the lower portion of the end of tank 10.

Now continuing with the construction of the rectangular shape box 12 as is shown, bottom insulation board 14 which has tank 10 resting thereupon, has connected on either side the first angled side insulation boards 16 and 18. It has been determined during manufacture that it is best to leave the longitudinal edges of boards 16 and 18 square and to bevel the longitudinal edges of bottom 14 and top insulation boards 20 and 21. In the preferred embodiment, these longitudinal edges are joined by means of an adhesive. Continuing up both sides, attached to first angled insulated board sides 16 and 18 are top angled insulation board sides 20 and 22 respectively, which again has a beveled longitudinal side connecting to the first angled insulation board sides and, also attached in the preferred embodiment by an adhesive. In the preferred embodiment, the type material that is used for the bottom board, the first angled side boards, and the top side boards is an insulation board made of urethane covered with a sunlight reflective foil surface. These insulation boards are purchased much like sheets of plywood with the sunlight reflective foil already attached to one of the planar surface of the board. As shown in the FIG. 2, this sun reflective foil surface 19 completely lines the interior of rectangular box 12 and is shown as a heavy line interiorly to the box in FIG. 2.

Holding the sides and bottom of the rectangular box 12 into structural integrity is outside frame 38, which in the preferred embodiment is an elongated top opening fiberglass concave shell, but which might also be constructed of sheet metal, wood, or other material.

In addition, to help minimize release of heat from the tank during times when the tank is hotter than the environment, supports 30 and 32 are also covered with the same selective coating 11 which covers the outside of tank 10, here shown as a thick line about the circumference of tank 10. In addition, the generally circular opposite ends of tank 10 are also covered with the same selective coating 11 which is attached to the outside of the tank.

The remaining features which are shown in FIG. 2 are those of the glazing utilized in the invention. Specifically, the invention is triple-glazed in the preferred embodiment, although for purposes of the invention a single or double glazing may be utilized, yet it has been found to achieve the superior performance which the Applicant has achieved in reducing re-radiation losses, and especially losses due to night time re-radiation (and of course, convection and conduction losses) triple glazing has proved the most satisfactory.

As can be seen, the inner most glazing 50 stretches from side to side, and from end to end, and is the closest to tank 10. An air seal between glazing 50 and the top side insulation boards 20 and 22 and the foil 19 surface thereon is achieved by fitting glazing piece 50 against the sides where the perimeter edge of glazing piece 50 has been turned up to lie against top side boards 20 and 22 and the end insulation boards with a sealant applied between the turned up edge of glaze piece 50 and the foil surface 19. Then, in the preferred embodiment, a staple is driven into the turned up side of glaze piece 50 and down into the top side insulation boards 20 and 22.

Similarily, glaze piece 52 is placed atop glaze piece 50, separated from glaze piece 50 and enclosing an airtight plenum by the same air sealing means as glaze piece 50 is attached to the sides 20 and 22, and the end pieces.

Then, upon the outside of rectangular box 12 a third glaze piece 54 is fitted, here the glaze material set within an aluminum frame 56 which is so sized that it will engage the corner of the top side insulation boards 20 and 22, as well as the end insulation boards 24 and 26. As can be seen in FIG. 2, the very top end of top side insulation boards 20 and 22 have been beveled on the outside side to accomodate aluminum frame 56. Also as shown in FIG. 2, the outside frame 38, which encompasses the exterior of the rectangular box 12, terminates at about the point on the top sides 20 and 22 where the beveled edge commences.

Finally, glaze piece 54 is sealed in an air-tight configuration by means of a sealant placed between the upper most edge of top side insulation boards 20 and 22, and end pieces 24 and 26, so that three sealed plenums of air are placed about and above tank 10.

Figure 3:
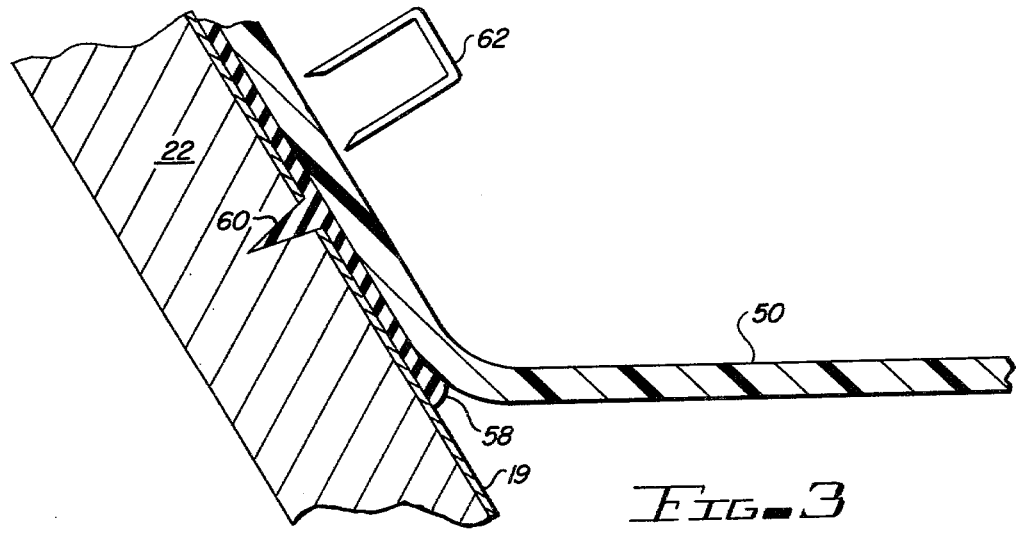
FIG. 3 is a cross-sectional view showing the connection of the glazing pieces and the side walls.

Referring now to FIG. 3, an enlarged view of the connection between glazing piece 50 and the top side insulation board 22 is detailed. FIG. 3 is representative of the type of connection at all points around the periphery of glazing pieces 50 and 52, including the ends 24 and 26. Shown in FIG. 3 is the top side insulation board 22, its reflective foil covering 19 and glaze piece 50. As can be seen, glaze piece 50 has its edges turned up to parallel the side of side piece 22. Between glaze piece 50 turned up side and the reflective foil 19 is placed the non-heat conductive sealant 58, shown here slightly oozing out of the edge of the turn of glaze piece 50. Noticable above the bottom of glaze piece 50 is notch 60 which is made by a knife or similar other sharp instrument around the inside periphery of the rectangular box 12 for the purpose of severing the foil reflective surface 19. The purpose for this is to present a barrier to heat being conducted along the foil thickness from the interior chamber housing tank 10 to the air spaces above glaze piece 50. This is one more method in which the Applicant reduces loss of heat from tank 10. It has been found, that when interrupting the foil reflective surface 19, that by merely scribing a knife edge around the interior of the box and penetrating a very short distance into side insulation boards 22 (and the others), rather than remove a thin strip from the surface, the stated purpose is accomplished most efficiently. Next, located immediately above notch 60 is staple 62 which is driven into glaze piece 50, through the sealant 58 and the foil reflective surface 19, to lodge in the top side insulation board 22. Staple 62, driven at a plurality of points around the edge of glaze piece 50, secures glaze piece 50 in the air-tight configuration sought.

Figure 8:
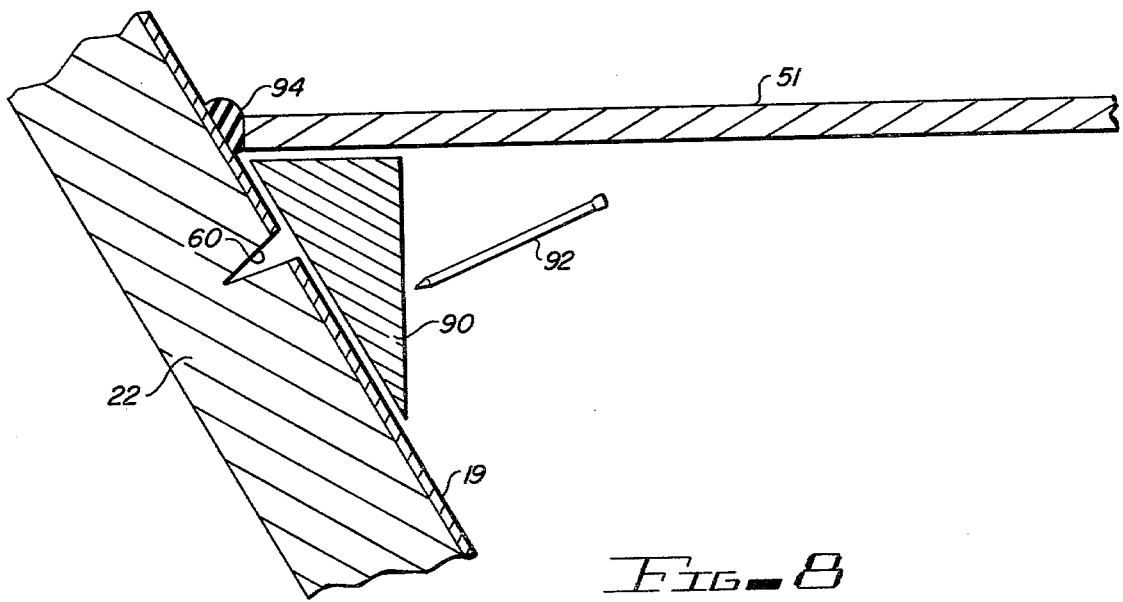
FIG. 8 is an alternate embodiment of the means by which the glazing pieces are constructed into the invention.

In the preferred embodiment, the glaze pieces which have been utilized comprise a translucent, preferably transparent, plexiglass, fiberglass acrylic composite, or other type of plastic. Glass may be utilized in the invention for the glaze pieces where an alternate embodiment shown later in FIG. 8 is adapted.

Figure 4:
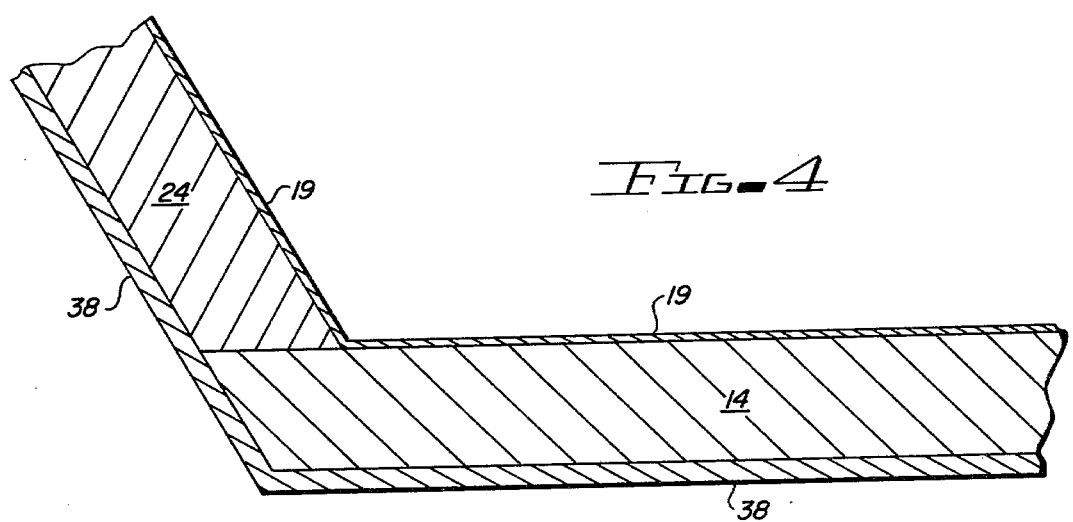
FIG. 4 is a cross-sectional view showing construction of the sides and end boards.

Referring now to FIG. 4, an enlarged view of the intersection of the insulation boards which are utilized in this invention is detailed. Remembering that the insulation board as supplied by its manufacturer is supplied with the sunlight reflective foil face already attached, it is obvious that the foil will conduct heat along its metal thickness and since the intent of the Applicant is to present an invention where heat loss is minimized, the technique shown in FIG. 4 is adapted.

FIG. 4 is a view taken along a sectional line of end insulation board 24 cut longitudinally along bottom board 14. Of particular interest here is that it will be noted that the reflective foil normally attached to bottom board 14 has been stripped in the area where end piece 24 joins bottom piece 14. By such technique, heat conduction along the thickness of reflective foil 19 is terminated at the inside juncture of end 24 and not conducted thereby to the inside portion of outside frame 38.

Figure 5:
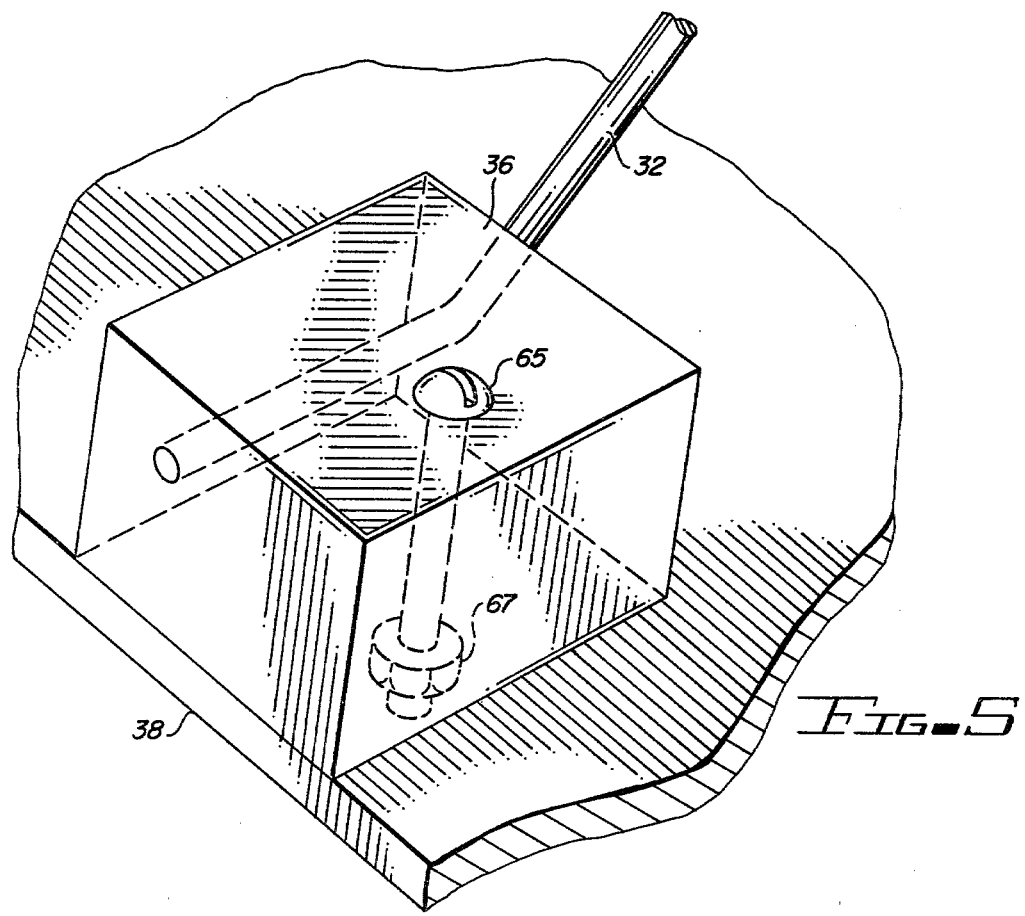
FIG. 5 is a perspective view of the means holding the water tank support rods.
Figure 6:
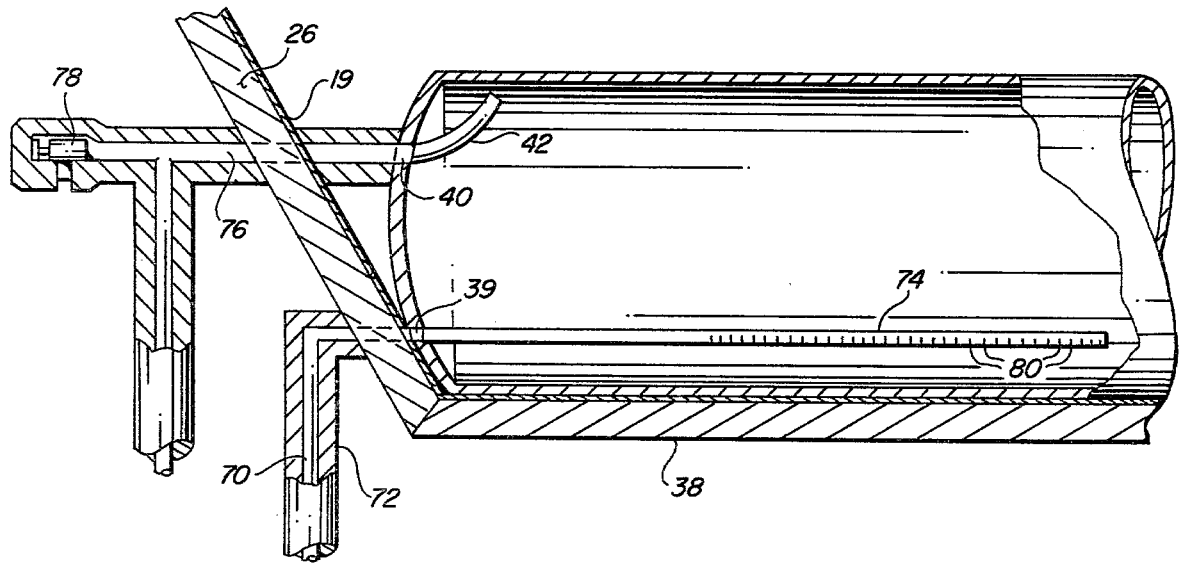
FIG. 6 is a cut-away view of the water holding tank and the means by which water is introduced and removed from the tank.

Referring now to FIG. 5, a perspective view is shown of the holding blocks 34 and 36 which receive the metal supports 30 and 32 welded to the ends of tank 10. As indicated in the description of FIG. 2, these holding blocks are recessed into the bottom piece 14, and slightly into the side of the first angled side 16 and 18, to the point where the holding blocks 34 and 36 engage directly the outside frame 39. It is noted that the support rod 32 engages holding block 36, nominally prepared from wood, such that the holding bolt 65 does not make metal contact with support 32 (of which the end just penetrating from holding block 36 is shown), and that holding bolt 65 resides between the end of support 32 and the tank 10. In this way, the material making up holding block 36 will be placed into a situation of compression between support 32 and holding bolt 65 as tension if placed on the support rod 32 when holding down tank 10. Holding bolt 65, which penetrates holding block 36, also penetrates outside frame 38 to which it is firmly attached by means of holding nut 67. FIG. 6 is a cross-sectional view taken of tank 10 showing the means by which cold water enters the bottom of the tank 10 and hot water is removed from the tank.

More specifically, tank 10 has entering at its lower portion inlet pipe 70 which is covered with insulation 72, both outside the rectangular box 12 and inside the internal cavity of rectangular box 12. At the point where the inlet pipe 70 penetrates the outside frame 38 and the end insulation board 26 and its foil covering 19, the insulation does not follow the inlet pipe, but stops, at the opening made through outside frame 38 and end insulation board 26. The inlet pipe then is sealed with a sealant around the pipe and the opening in order to keep the interior of the solar water heater substantially airtight. The inlet pipe then attaches to tank 10 through coupling 39. From coupling 39 and penetrating interiorly to the tank is what is referred to as drooler tube 74 which runs substantially the length of the tank 10 and is capped at its far end. It is constructed by placing a plurality of slits transverse to the tube 74 and pointed toward the bottom of tank 10. These slits are made, in the preferred embodiment, by means of sawing crosswise into the tube a relatively short distance, certainly not more than one/half the thickness of the tube. By this means, the cold water is injected into the tank at the lowest and coldest part of the tank and with as little velocity as possible in order to reduce mixing of the hot water at the top portion of the tank with the cold water at the bottom. Of course, as the water is heated in the tank, the hottest of the water will tend to rise to the top.

Now referring to the means by which hot water is withdrawn from tank 10, as can be seen in FIG. 6, piping 42 internally to the tank 10 runs from the fitting 40 to the uppermost portion of the tank. Now in practice, the solar heater of the invention is placed upon a roof or other support generally located in an east-west direction with one end slightly angled so that the end containing the pipe 42 is in elevation slightly higher than the other end of the tank. The reason for this, in addition to the water being hotter at this position than in a similar position at the other end of the tank, is in order that the tank may be purged of air when it is first set up whereby the air will preceed the water out of the tank and the chance of a sizable air bubble being trapped in the tank is minimized.

Continuing, from fitting 40 outlet pipe penetrates end insulated board 26, including its foil reflective surface 19, and the outer frame 38 which is accomplished similarily as regards inlet pipe 70, i.e., insulation covers outlet pipe 76 along its total length, stopping only in the penetration through the solar heater box 12 end. Again a sealant is placed within the opening formed in end 26 and between outlet pipe 76 to enhance air tightness. Outlet pipe 76 continues to pressure relief valve 78, also covered with insulation except for its over-pressure outlet port. Pressure relief valve 78 is designed to discharge water in the event that the pressure interior to tank 10 exceeds a predetermined level. Outlet pipe then continues into the residence or where-ever the invention is being used, the pipe being insulated at least to the edge of the house or residence.

Figure 7:
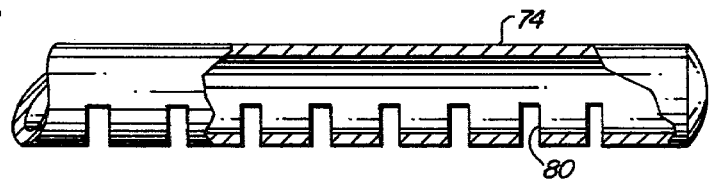
FIG. 7 is a diagramic view of the drooler tube introducing cold water into the heated water tank.

Referring now to FIG. 7, a diagramic view of the drooler tube 74 is shown showing the slits 80 which discharges the inlet water towards the bottom of tank 10. Cap 82 terminates the end of drooler tube 74.

Now while the preferred embodiment of the subject invention has been shown and described, it has been determined that in the event the type of glazing used is not of the type which may be turned up at the end and which would not receive a staple without breaking, i.e., such as glass, then FIG. 8 shows a cross-sectional view of a satisfactorily alternate embodiment. FIG. 8, much like FIG. 3, is taken at the edge of the glazing piece 51, here glass substituted for glaze piece 50, and its intersection with side insulation board 22. As can be seen, notch 60 interrupting the foil reflective surface 19 of insulation board side 22 is still present, only now a triangular shaped elongated strip 90, preferably wood or other type of insulative material, and held in place by nail 92, covers notch 60. Upon the top side of strip 90 rests glazing piece 51 and the air seal interior to the invention is maintained through a sealant 94 placed between the glass 51 and foil surface 19. Again this scheme is repeated for the glaze piece immediately above 50 in FIG. 2. The strip 90 is continued about the total interior of the rectangular box 12, as is the notch 60, and sealant 94.

While a preferred embodiment has been shown and described together with an alternate embodiment, it would be understood that there is no intent to limit the invention by such disclosure, that rather it is intended to cover all modifications and alternate construction falling within the spirit and the scope of the invention as defined in the appended claims.

I claim:

1. A passive solar heater of the type combining the heat absorber and fluid storage in a tank adapted to be exposed to solar energy, said heater comprising:
   (a) an enclosure having walls defining an interior chamber therein, said enclosure having an opening adapted to admit the sun's rays therethrough;
   (b) a fluid storage tank positioned within the chamber in said enclosure, said tank including a selected surface coating characterized by high heat absorptance and low heat emissivity;
   (c) insulative lining on the interior walls of said enclosure, said insulative lining including a sun reflective foil surface lining the inside walls of said insulative material so aligned to reflect the sun's rays impinging on the foil and redirect the rays toward the said tank;
   (d) tank support means connecting the tank to the enclosure, said tank support means including intermediate insulative means adapted to receive and hold said supports in fixed, non-contact arrangement with the enclosure;
   (e) said supports including a selected coating characterized by high heat absorptance and low heat emissivity;
   (f) multiple glazings extending across said opening in said enclosure, said glazings being spaced apart and extending to said insulative lining, said glazings being secured at the inner side of said enclosure side wall at said lining with nonconductive air sealant being interposed between said glazing edges and said insulative material lining whereby the opening of the enclosure is made substantially air-tight; and
   (g) means to interrupt the heat conduction path along the sun reflective foil from the inside of the enclosure, said means including scribing in said sun reflective foil proximate to each glazing, said scribing extending through the foil and being covered by non-heat-conductive sealant.

2. The improvement in passive solar water heaters as defined in claim 1 further including means to withdraw hot water from the tank, said means comprising pipe means entering the tank at one end and angling to the uppermost portion of the tank.

3. The improvement in passive solar water heaters as defined in claim 1 further including means to input cold water into the tank with minimum mixing with the tank's hot water, said means comprising a drooler tube penetrating the tank and situated interiorly the tank's lower portion, said drooler tube having a plurality of openings oriented downward in the tank, and said drooler tube having a cap at its end distal the end penetrating the tank whereby the cold water is inputed to the tank with minimum mixing with the heated water.

* * * * *